(12) United States Patent
Chandram et al.

(10) Patent No.: US 12,380,015 B1
(45) Date of Patent: Aug. 5, 2025

(54) PREDICTING TESTS BASED ON CHANGE-LIST DESCRIPTIONS

(71) Applicant: Synopsys, Inc., Mountain View, CA (US)

(72) Inventors: Pranay Reddy Chandram, Bangalore (IN); Kavish Seth, Bengaluru (IN)

(73) Assignee: SYNOPSYS, INC., Sunnyvale, CA (US)

( * ) Notice: Subject to any disclaimer, the term of this patent is extended or adjusted under 35 U.S.C. 154(b) by 223 days.

(21) Appl. No.: 17/845,751

(22) Filed: Jun. 21, 2022

Related U.S. Application Data

(60) Provisional application No. 63/213,331, filed on Jun. 22, 2021.

(51) Int. Cl.
*G06F 11/36* (2025.01)
*G06F 11/22* (2006.01)
*G06F 11/263* (2006.01)
*G06F 11/3668* (2025.01)
*G06N 20/00* (2019.01)

(52) U.S. Cl.
CPC ...... *G06F 11/3684* (2013.01); *G06F 11/2263* (2013.01); *G06F 11/263* (2013.01); *G06F 11/368* (2013.01); *G06F 11/3688* (2013.01); *G06N 20/00* (2019.01)

(58) Field of Classification Search
CPC .......... G06F 11/3684; G06F 11/2263; G06F 11/263; G06F 11/368; G06F 11/3688; G06F 11/3692; G06N 20/00
See application file for complete search history.

(56) References Cited

U.S. PATENT DOCUMENTS

| | | | |
|---|---|---|---|
| 11,074,164 B1* | 7/2021 | Yarabolu | G06F 11/3438 |
| 2020/0242013 A1* | 7/2020 | Hicks | G06F 11/3684 |
| 2020/0257840 A1* | 8/2020 | Huh | G06F 30/27 |
| 2020/0285569 A1* | 9/2020 | Tung | G06F 11/368 |
| 2022/0066747 A1* | 3/2022 | Drain | G06N 3/045 |
| 2022/0398368 A1* | 12/2022 | Dan | G06F 30/27 |
| 2023/0192147 A1* | 6/2023 | Raina | G01C 21/3804 |
| | | | 701/23 |
| 2024/0168859 A1* | 5/2024 | Yang | G06F 11/3604 |

OTHER PUBLICATIONS

2024 AI SME Update Examples 47 49 (Year: 2024).*
Wikipedia—Test_automation—May 28, 2021 (Year: 2021).*
Wikipedia—Artificial_neural_network—May 21, 2021 (Year: 2021).*
Wikipedia—Supervised_learning—May 14, 2021 (Year: 2021).*

* cited by examiner

*Primary Examiner* — Marc Duncan
*Assistant Examiner* — Michael Xu
(74) *Attorney, Agent, or Firm* — Laxman Sahasrabuddhe; Park, Vaughan, Fleming & Dowler LLP

(57) ABSTRACT

Training data may include change-lists and descriptions associated with the change-lists. A change-list may specify a set of changes to a design or a test case, or both. The descriptions may be specified in a natural language. A machine learning (ML) model may be trained based on the training data. A first change-list and a first description for a first design may be received. The trained ML model may be used to predict a first set of test cases for testing the first design based on the first change-list and the first description.

10 Claims, 9 Drawing Sheets

PREDICTING TESTS BASED ON CHANGE-LIST DESCRIPTIONS

RELATED APPLICATION

This application claims the benefit of U.S. Provisional Application Ser. No. 63/213,331, filed on 22 Jun. 2021, the contents of which are herein incorporated by reference in their entirety for all purposes.

TECHNICAL FIELD

The present disclosure generally relates to testing integrated circuit (IC) or software designs. More specifically, the present disclosure relates to predicting tests based on change-list descriptions.

BACKGROUND

During development of software and/or integrated circuit (IC) designs, the designs may evolve progressively as incremental changes are made to the design (the term "design" hereinafter refers to a software design or an IC design). Incremental changes may be applied to the design when errors or bugs are identified and fixed in the design.

Even though the design changes may be small and incremental, a large battery of tests may be run periodically to ensure that the design has the desired functionality. Executing a large battery of tests on a design can require a large amount of time and resources.

SUMMARY

Embodiments described herein may predict tests based on change-list descriptions. Training data may be received, where the training data may include change-lists and descriptions associated with the change-lists. A change-list may specify a set of changes to a design or a test case, or both. The descriptions may be specified in a natural language. A machine learning (ML) model may be trained based on the training data. A first change-list and a first description for a first design may be received. The trained ML model may be used to predict a first set of test cases for testing the first design based on the first change-list and the first description. The first design may be tested using the first set of test cases.

In some embodiments described herein, the ML model may include a first neural network (NN) which may include a first input layer and a first output layer. The first input layer may include a first set of input nodes corresponding to an author name, a file name, and a set of vocabulary words or phrases. The first output layer may include a first set of output nodes corresponding to a set of test categories.

In some embodiments described herein, the ML model may include a second NN which may include a second input layer and a second output layer. The second input layer may include a second set of input nodes corresponding to an author name, a file name, and a set of word or character positions in the first description. The second output layer may include a second set of output nodes corresponding to the set of test categories.

In some embodiments described herein, ML model includes a third NN which may include a third input layer and a third output layer. The third input layer may include a third set of input nodes corresponding to the first set of output nodes and the second set of output nodes. The third output layer may include a third set of output nodes corresponding to the set of test categories.

In some embodiments described herein, the first design may fail one or more test cases in the first set of test cases. In this scenario, a second design may be created by modifying the first design to overcome the failure of the one or more test cases. A second change-list and a second description for a second design may be received (e.g., the second change-list may correspond to the changes made to the first design to create the second design). The trained ML model may be used to predict a second set of test cases for testing the second design based on the second change-list and the second description.

In some embodiments described herein, the first design may pass the first set of test cases. In this scenario, the first design may be tested using a second set of test cases, where the second set of test cases is different from the first set of test cases. For example, the second set of test cases may include all test cases or a superset of the first set of test cases. If the first design fails one or more test cases in the second set of test cases, then the failed test cases in the second set of test cases may be used to train the ML model.

BRIEF DESCRIPTION OF THE FIGURES

The disclosure can be understood based on the detailed description given below and the accompanying figures. The figures are for illustrative purposes, and do not limit the scope of the disclosure. Furthermore, the figures are not necessarily drawn to scale.

DETAILED DESCRIPTION

Figure 1:
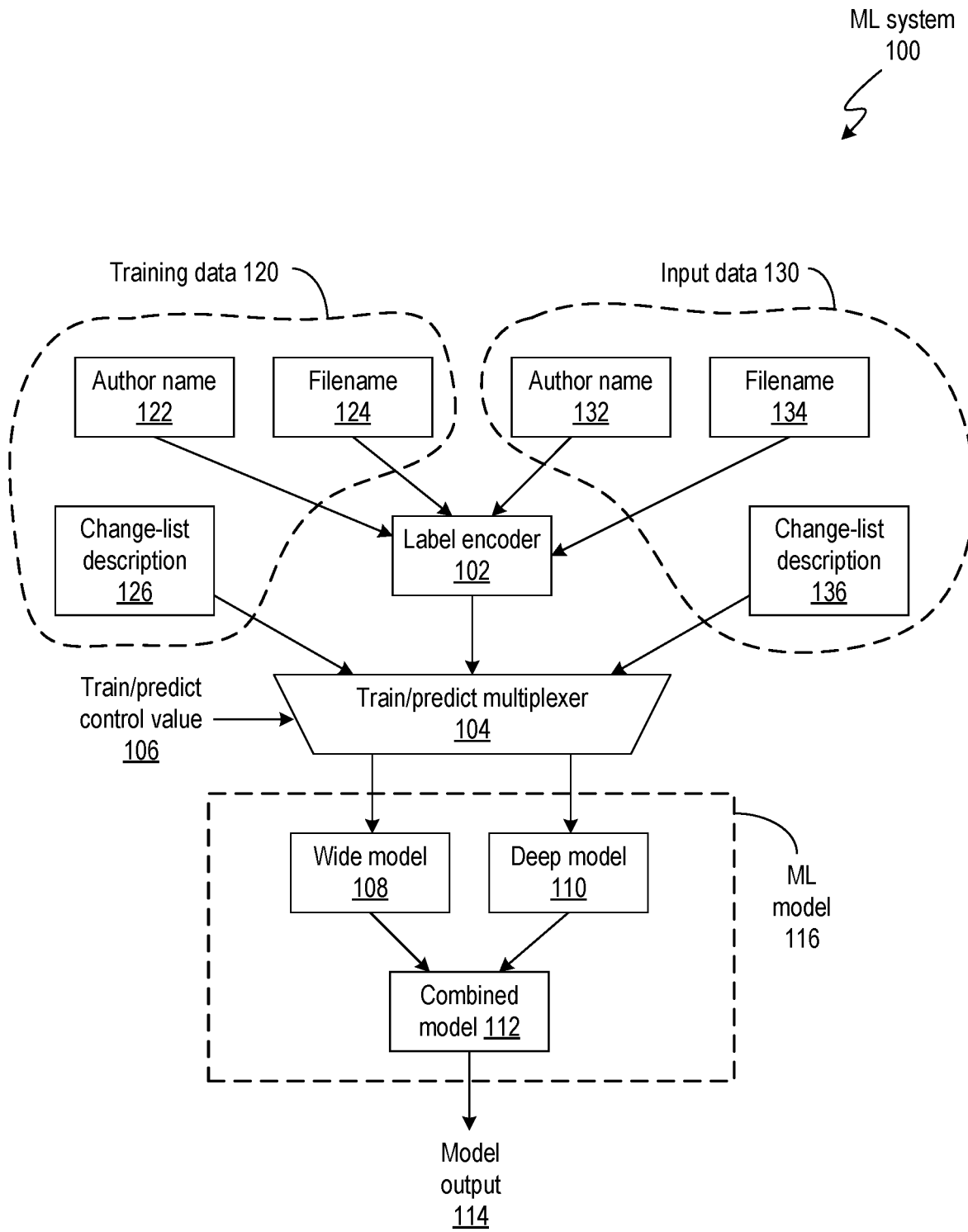
FIG. 1 illustrates an ML system for predicting tests based on change-list descriptions in accordance with some embodiments described herein.

Software or digital designs may evolve over time as incremental changes are made to the design. Incremental changes may also be made to the design during debugging. Although the design changes are small, the testing requirements that make sure the design changes do not break or deviate from the original desired functionality may be large. The tests may cover areas, features and functions of the design, but many tests may not be related to the design change. At the same time, running a large number of tests on a design may require many resources, which include, but are not limited to, licenses, machines, and time.

Once the testing completes, time may be needed to analyze the results. Specifically, human resources may be required to analyze tests that have failed to identify the reason why the test failed. In some cases, the tests could have failed due to the tests not being updated, or because the design team did not intend to fix the design (i.e., the design may have failed a previous regression test and the design team may have decided to not make changes to the design to fix the regression test failure).

Some embodiments described herein substantially reduce the amount of resources used for testing a design, where the resources include, but are not limited to, time, machine, and license requirements. Specifically, instead of running a complete suite of tests during a regression test run, some embodiments described herein run a directed suite of tests (which may be significantly smaller than the complete suite of tests) that target a given design change. Some embodiments described herein may achieve the reduction in resources used for testing by identifying a set of changes that were made to the design and identifying the "domain" or "function of design" under which the changes are categorized. Specifically, some embodiments described herein may use a machine learning (ML) model to detect and classify the design changes.

For example, a design may be maintained using a version control system, which may keep track of the changes that are made to a design. Specifically, for every change that is made to the design, the version control system may store information related to the change, which may include, but is not limited to, the check-in time, information about the files that were checked-in, and information about the user(s) who modified and/or checked-in the files. Information about a set of changes that were made to a design over a fixed time duration (e.g., the last 24 hours) or during a specific period selected by a user may be retrieved from the version control system. The retrieved information about the set of changes may be provided to the ML model, which may select a subset of tests to run against the changed design. In some embodiments, the ML model may include one or more NNs.

A design (e.g., an IC design or a software application) may be specified using a large number of files (e.g., thousands of files). Certain design files may be associated with a specific part or functionality of the design. These design files may be modified by a certain set of engineers that is responsible for developing and/or maintaining this specific part or functionality of the design. Thus, an association may exist between engineers, files, and the parts of the design because engineers who are responsible for a specific part of the design may create and/or modify files of the design that relate to the specific part of the design. This association between engineers, files, and the parts of the design may enable an ML model to classify the design files as belonging to the different parts of the design that the engineers work on.

FIG. 1 illustrates an ML system for predicting tests based on change-list descriptions in accordance with some embodiments described herein.

ML system 100 may be used in two modes. In a training mode, training data 120 may be used to train ML model 116. In a prediction mode, input data 130 may be provided as input to ML system 100, and model output 114 may include predictions made by ML model 116. Train/predict control 106 may be used to select between training and prediction modes.

When a file or a set of files are checked into a version control system, the author(s) of the file(s) may write comments that describe the change and describe what has changed in the file. The term "change-list" may refer to the set of files that have been changed and that are desired to be checked-in into the version control system. The natural language description that describes the change may be used to predict and classify the nature of the change to the design/software. The term "natural language" may generally refer to any language that is used by humans to communicate with each other, including, but not limited to, English.

Thus, a change-list may include a set of design files and/or test files that have been modified. A design file may specify (e.g., using a software programming language or hardware description language) one or more portions of a design. A test file may include one or more test cases, which may be used by a testbench to test one or more portions of the design specified in the design files. Design files and/or test files may be maintained by a version control system, and the design files and/or test files may be associated with a natural language description of the changes when the design files and/or test files are checked into the version control system.

The set of test cases may be classified into a set of test categories. A test case may be part of one or more test category. A test category may include test that are intended to test a particular portion or functionality of the design. For example, a test category may include a set of test cases intended to test a software module or circuit block, which may be implemented using a set of design files. This mapping between test cases and test categories may be created by the user. For example, a user who writes the code for a software module may create one or more test cases to test the code. Thus, these test cases may be included in the test category that is associated with the software module.

Training data 120 may include information associated with a change-list that is used during training, which may include, but is not limited to, author name 122, filename 124, and change-list description 126 (which may be in a natural language). Training data 120 may also include the test cases or test categories that are desired to be selected for a given author name 122, filename 124, and change-list description 126 (the desired test cases or test categories may be based on test results obtained from previous regression runs). Input data 130 may include information associated with a change-list that is used during prediction, which may include, but is not limited to, author name 132, filename 134, and change-list description 136 (which may be in a natural language).

Some ML models may use data in a particular format. For example, the input and output data for an NN model may be numerical. Thus, in some embodiments described herein, label encoder 102 may be used to convert at least some portions of training data 120 and input data 130 into a format that can be handled by ML model 116. Additionally, the change-list description may also be converted into numerical form. Specifically, each unique word in the change-list description may be assigned a unique number.

Train/predict multiplexer 104 may be used to switch ML system 100 between training and predicting modes based on train/predict control value 106. Specifically, training data 120 may be used to train ML model 116. Once ML model 116 has been trained, ML model 116 may be used to generate predictions (e.g., model output 114) based on input data 130.

In some embodiments described herein, ML model 116 may include wide model 108, deep model 110, and combined model 112. The output from label encoder 102 and change-list description 126 (or change-list description 136) may be provided to wide model 108 and deep model 110.

The outputs from wide model 108 and deep model 110 may be provided as inputs to combined model 112, and the output of combined model 112 may be outputted as model output 114. In some embodiments described herein, the outputs of model 108 and deep model 110 may be concatenated and provided as input to combined model 112. In some embodiments described herein, wide model 108 may be trained using the author name, file name, date, and deep model 110 may be trained using the change-list descriptions. In some embodiments described herein, wide model 108, deep model 110, and combined model 112 may be implemented using NNs.

Figure 2:
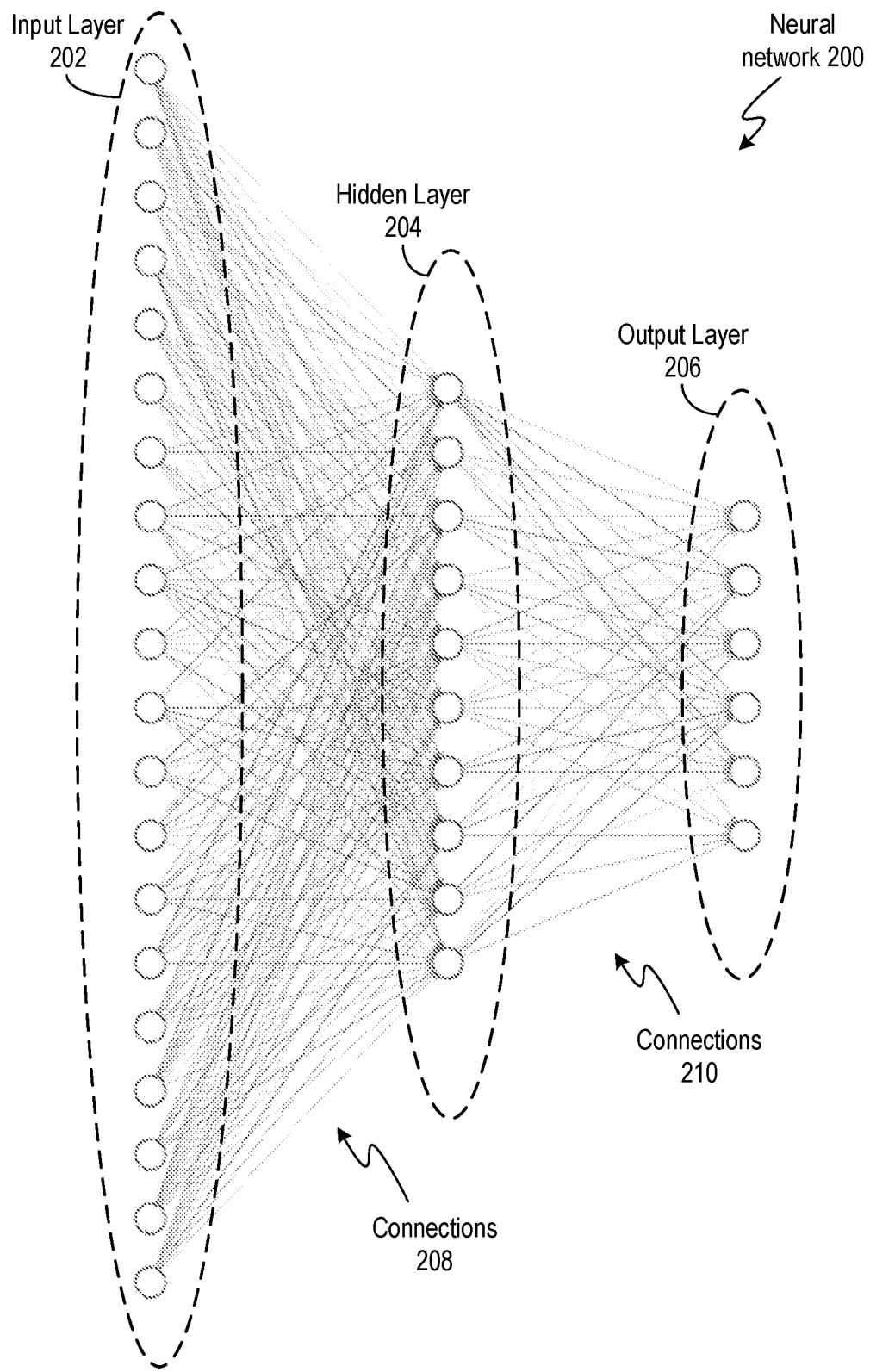
FIG. 2 illustrates an NN in accordance with some embodiments described herein.

FIG. 2 illustrates an NN in accordance with some embodiments described herein.

Each NN may include two or more layers of nodes, e.g., an input layer, zero or more hidden layers, and an output layer. For example, NN 200 includes input layer 202, hidden layer 204, and output layer 206. A node in a layer may be connected to one or more nodes of an adjacent layer. For example, connections 208 connect nodes of input layer 202 with nodes of hidden layer 204, and connections 210 connect nodes of hidden layer 204 with nodes of output layer 206.

The input training data (which may be numerical) may be fed into the nodes of the input layer (e.g., input layer 202). Each node may have an activation function, and each connection between two nodes may be associated with a weight. In some embodiments described herein, the ReLU (Rectified Linear Unit) may be used as the activation function. In other embodiments, other activation functions may be used, including, but not limited to, ELU (Exponential Linear Unit) and Leaky ReLU.

A node may output a value based on its activation function and the weighted values received over connections from a previous layer. Thus, the values fed to the nodes in the input layer (e.g., input layer 202) may be propagated through the NN until the values reach the nodes of the output layer (e.g., output layer 206). The values at nodes of the output layer (e.g., output layer 206) may correspond to the predicted output of the NN. During training, the predicted output may be compared with a desired output, and an error between the two may be backpropagated from the output layer (e.g., output layer 206) toward the input layer (e.g., input layer 202). During backpropagation, the connection weights may be adjusted (e.g., weights associated with connections 210 and 208 may be adjusted during backpropagation), which may enable the NN (e.g., NN 200) to learn the relationship between the input data (e.g., the input training data that was fed to the nodes of input layer 202) and the desired output data (e.g., the output values that are desired to be produced at nodes of output layer 206). Once NN 200 has been trained (i.e., NN 200 has learned the relationship between the training inputs and outputs), NN 200 may be presented with a new set of inputs at the input layer (e.g., input values are fed into input layer 202), and the outputs from NN 200 (e.g., output values generated by output layer 206) may be used as the predicted outputs.

Figure 3:
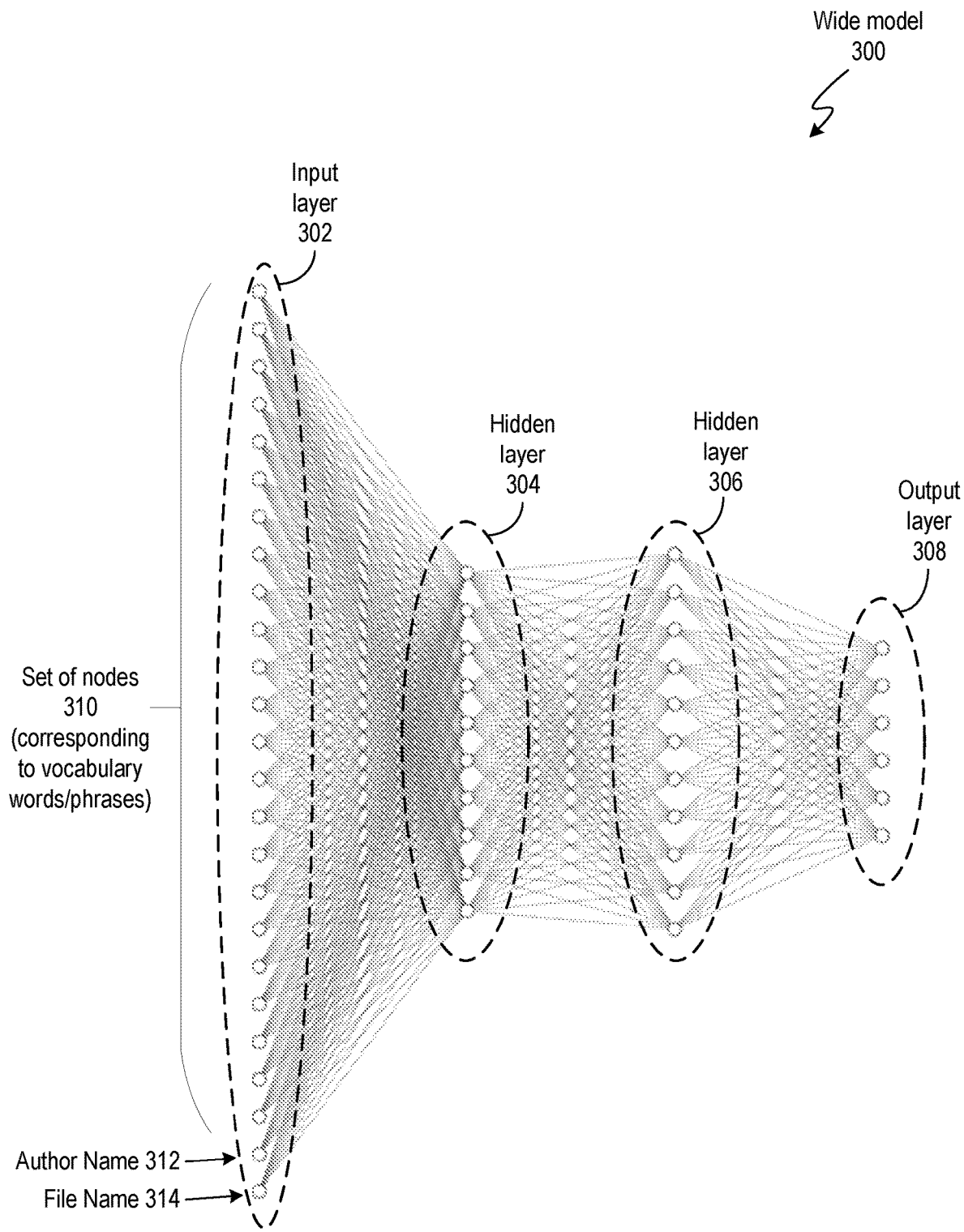
FIG. 3 illustrates a wide model in accordance with some embodiments described herein.

FIG. 3 illustrates a wide model in accordance with some embodiments described herein.

Wide model 300 may include input layer 302, one or more hidden layers (e.g., hidden layers 304 and 306), and output layer 308. In some embodiments described herein, a first node in input layer 302 may be provided an encoded version of author name 312 (e.g., the label generated by label encoder 102 in FIG. 1 for the author name) and a second node in input layer 302 may be provided an encoded version of file name 314 (e.g., the label generated by label encoder 102 in FIG. 1 for the file name). A set of vocabulary words/phrases may be created which may include words/phrases extracted from natural language descriptions associated with change-lists. A set of nodes 310 (which may not include the first node and the second node) in input layer 302 may correspond to set of vocabulary words and/or phrases.

Specifically, in some embodiments described herein, a change-list may be received. The change-list may be associated with an author name, a file name, and a natural language description. The author name, file name, and phrases/words in the natural language description may be mapped to numerical values, and the numerical values may be provided as input to the corresponding nodes in input layer 302.

In some embodiments described herein, input layer 302 may include one node for the author name 312, one node for the file name 314, and 12,000 nodes for the set of vocabulary words/phrases (e.g., set of nodes 310). Thus, in these embodiments, input layer 302 may include 12,002 nodes. Hidden layer 304 may include 1,024 nodes, and hidden layer 306 may include 1,360 nodes. The activation function used in the hidden layer may be ReLU. Output layer 308 may include one node per test category. Each node in output layer 308 may correspond to a test category, e.g., output layer 308 may include six nodes, where each node corresponds to a test category.

Figure 4:
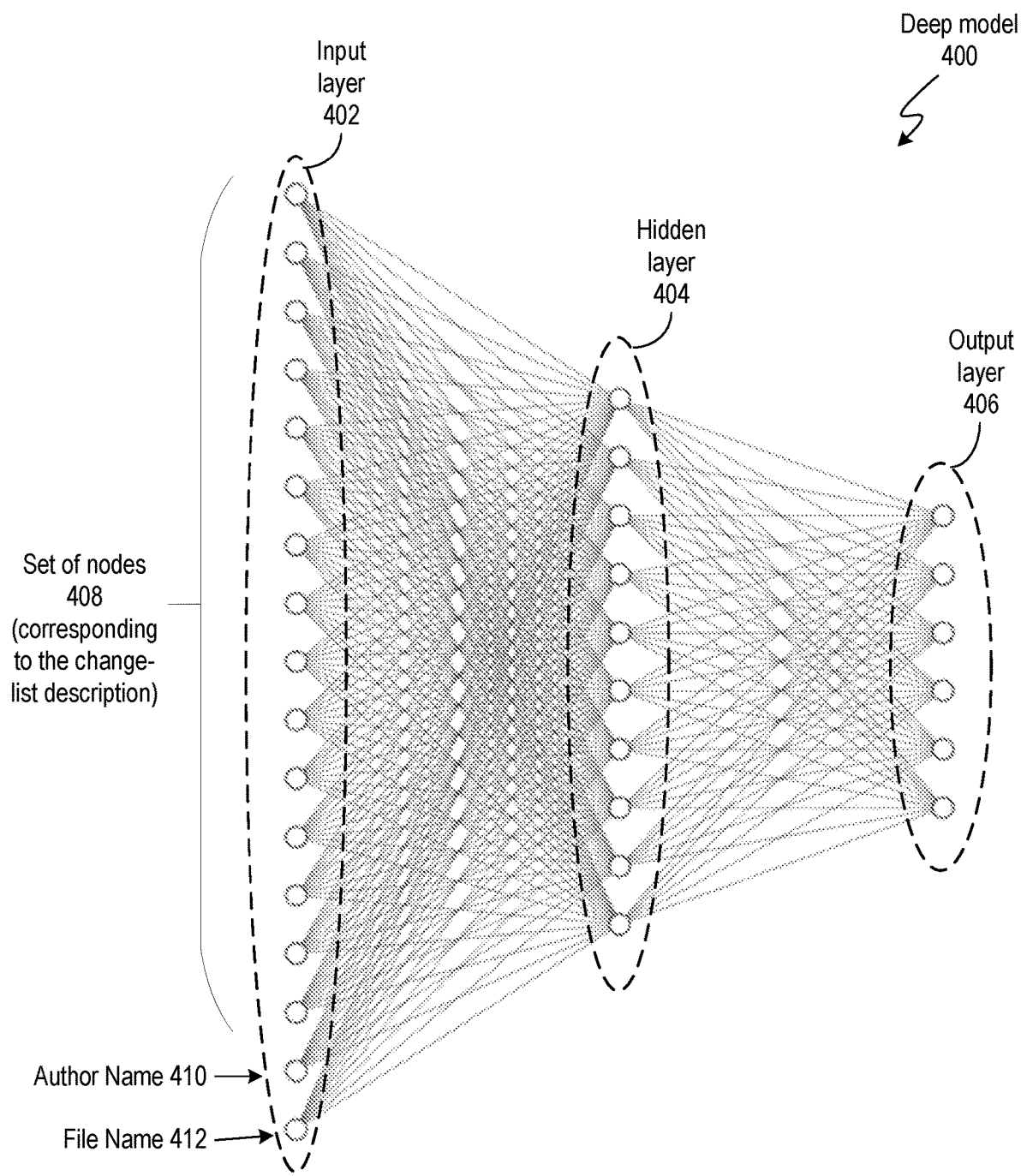
FIG. 4 illustrates a deep model in accordance with some embodiments described herein.

FIG. 4 illustrates a deep model in accordance with some embodiments described herein.

Deep model 400 may include input layer 402, one or more hidden layers (e.g., hidden layer 404), and output layer 406. In some embodiments described herein, a first node in input layer 402 may be provided an encoded version of author name 410 (e.g., the label generated by label encoder 102 in FIG. 1 for the author name) and a second node in input layer 402 may be provided an encoded version of file name 312 (e.g., the label generated by label encoder 102 in FIG. 1 for the file name). A set of nodes 408 (which may not include the first node and the second node) in input layer 402 may correspond to the change-list description. In some embodiments, each node in set of nodes 408 may correspond to a word or character location in the change-list description. Specifically, a prefix of the change-list description may be split into a set of words or characters. Next, each word or character in the set of characters may be mapped to a numerical value, and the numerical values may be provided as input to set of nodes 408.

In some embodiments described herein, a change-list may be received. The change-list may be associated with an author name, a file name, and a natural language description. The author name and file name may be mapped to numerical values, and the numerical values may be provided as input to the corresponding nodes (410 and 412) in input layer 402. A prefix (e.g., the first N words or characters) in the change-list description may be converted into a sequence of numerical values, and the sequence of numerical values may be provided as input to set of nodes 408.

The change-list descriptions can be of varying lengths, i.e., some may be very long and detailed and some may just have a few words. In some embodiments described herein, a 170-word length sentence may be used. Smaller sentences may be padded, and longer sentences may be truncated. The 170-word sentence may be transformed by mapping each word to a corresponding numerical value, and the post-transformation output may be fed to set of nodes 408 in input layer 402 of deep model 400. Thus, in these embodiments, input layer 402 may include 172 nodes. Additionally, in these embodiments, hidden layer 404 may include 1,024 nodes. Each node in output layer 406 may correspond to a test category, e.g., output layer 406 may include six nodes, where each node corresponds to a test category.

Figure 5:
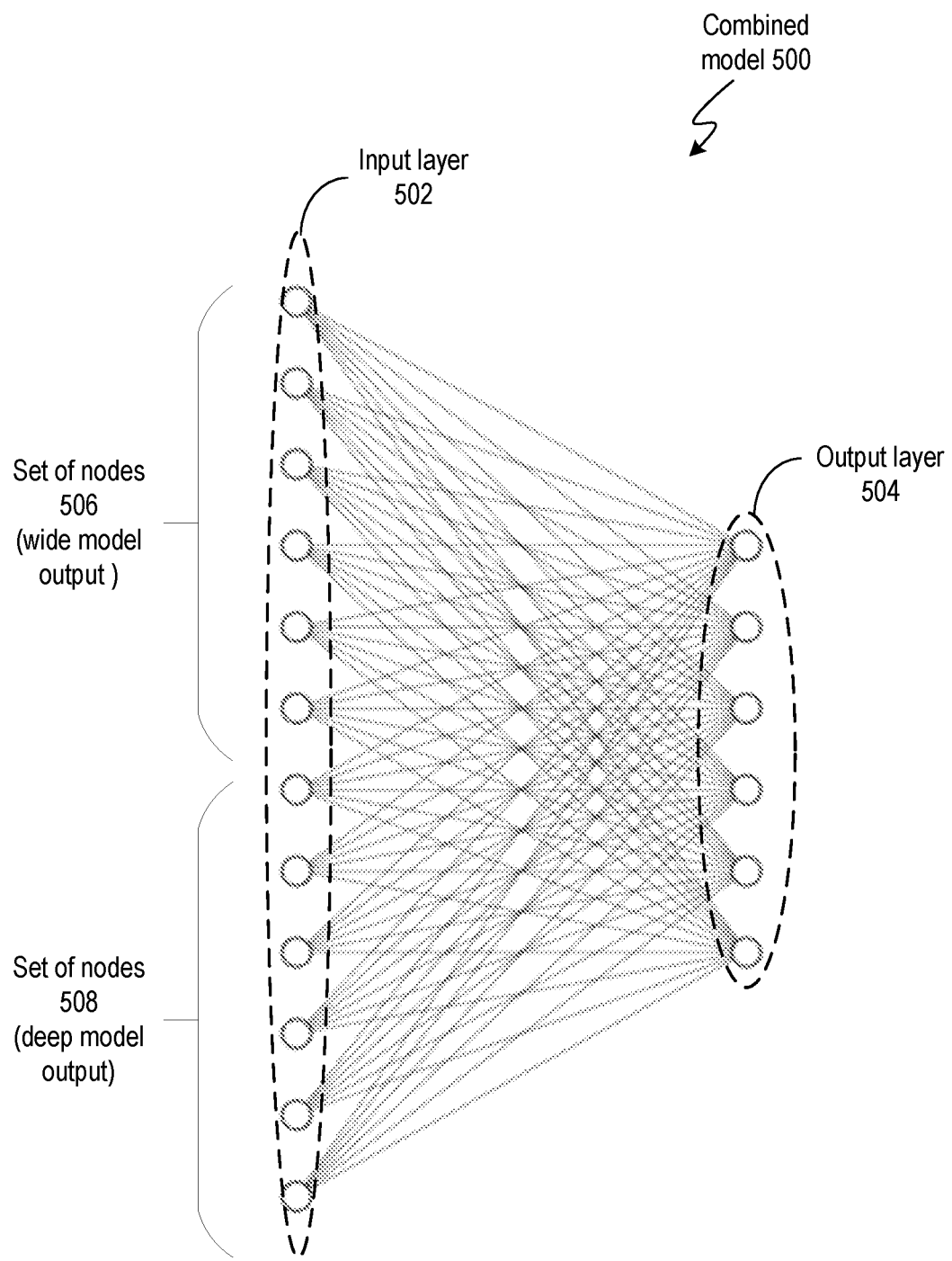
FIG. 5 illustrates a combined model in accordance with some embodiments described herein.

FIG. 5 illustrates a combined model in accordance with some embodiments described herein.

Combined model 500 may include input layer 502 and output layer 504. Input layer 502 may include a first set of nodes 506 which may receive the wide model output values (e.g., values from output layer 308 in FIG. 3), and a second set of nodes 508 which may receive the deep model output values (e.g., values from output layer 406 in FIG. 4). Output layer 504 may provide a combined prediction based on the trained wide model 300 and trained deep model 400. Specifically, wide model 300 and deep model 400 may be trained individually using training data 120. Once wide model 300 and deep model 400 have been trained, they may be frozen, e.g., the NN connection weights in wide model 300 and deep model 400 may not be modified. Next, combined model 500 may be trained using training data 120. Specifically, the outputs generated by trained wide model 300 and deep model 400 may be provided as inputs to combined model 500 and the desired output values in training data 120 may be used for backpropagation in combined model 500.

In one experiment, 2,000 test cases were used in a regression system. Regression tests performed using the ML system 100 in FIG. 1 used 70% less time and 50% less compute resources than a full regression test. In other words, embodiments described herein significantly reduce (1) the amount of time used for running regression tests and (2) the cost of the computational resources and/or infrastructure used for running regression tests.

Figure 6:
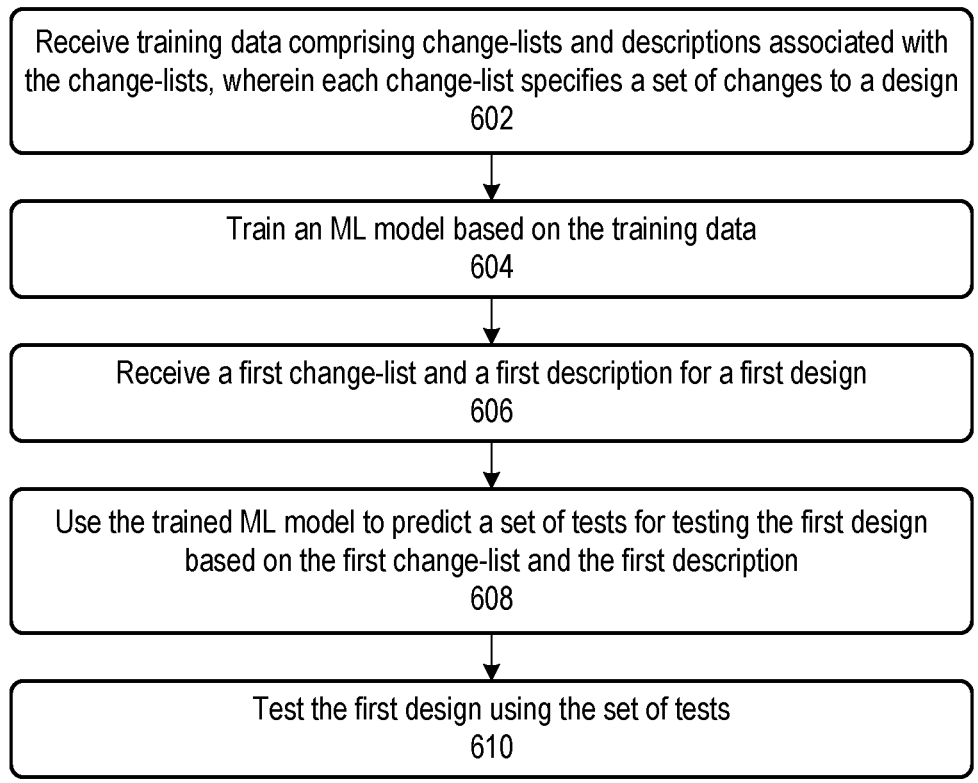
FIG. 6 illustrates a process for using an ML model to predict tests based on change-list descriptions in accordance with some embodiments described herein.

FIG. 6 illustrates a process for using an ML model to predict tests based on change-list descriptions in accordance with some embodiments described herein.

Training data comprising change-lists and descriptions associated with the change-lists may be received, where each change-list may specify a set of changes to a design (at 602). An ML model may be trained based on the training data (at 604). A first change-list and a first description for a first design may be received (at 606). The trained ML model may be used to predict a set of tests for testing the first design based on the first change-list and the first description (at 608). The first design may then be tested using the set of tests (at 610). In some embodiments described herein, the ML model may include one or more NNs. Specifically, the ML model may include a first NN, a second NN, and a third NN. The first NN may include nodes corresponding to an author name, a file name, and a set of vocabulary words and/or phrases. The second NN may include nodes corresponding to an author name, a file name, and a set of words and/or characters locations in a change-list description. The third NN may include nodes corresponding to the outputs of the first NN and the second NN.

Figure 7:
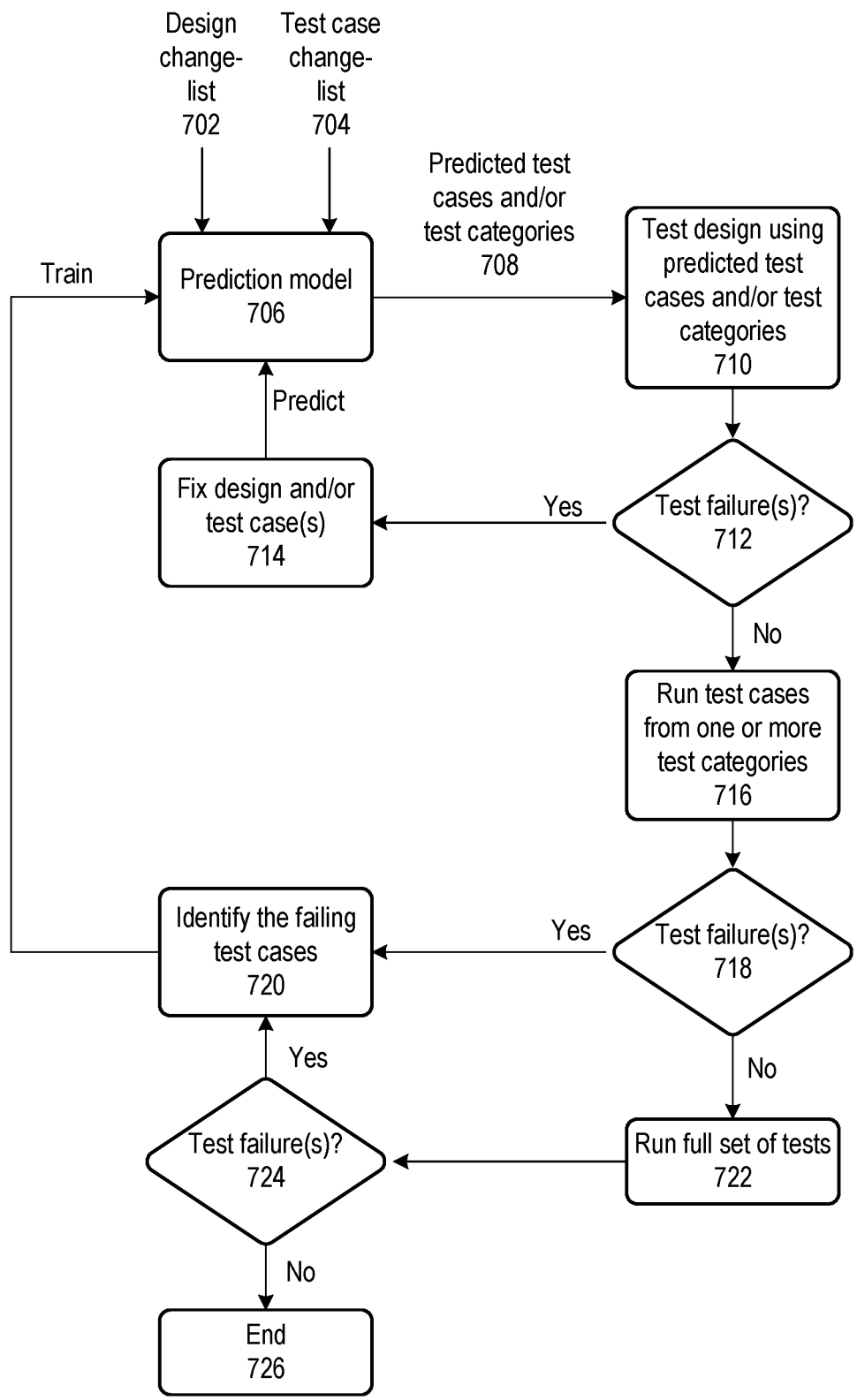
FIG. 7 illustrates a process for testing a design using an ML model in accordance with some embodiments described herein.

FIG. 7 illustrates a process for testing a design using an ML model in accordance with some embodiments described herein.

A change-list may include design change-list 702 and test case change-list 704, which may be provided as input to prediction model 706. Prediction model 706 may correspond to ML model 116 in FIG. 1. Prediction model 706 may output predicted test cases and/or test categories 708, which may be used to test the design (at 710). The test results may be checked for any test failure(s) (at 712). If there were test failures ("Yes" branch emanating from 712), then the design and/or test cases may be fixed (at 714), and the resulting change-list may be provided as input to prediction model 706.

On the other hand, if no tests failed ("No" branch emanating from 712), then test cases from one or more test categories may be run (at 716). Specifically, the test categories that correspond to the portions or functionalities that were changed may be selected. The test results may be checked for any test failure(s) (at 718). If there were test failures ("Yes" branch emanating from 718), then the failing test case may be identified (at 720). The failing test cases and the corresponding test categories may then be used to incrementally train prediction model 706, e.g., the failing test cases and the corresponding test categories may be used in one or more training iterations to improve the accuracy of prediction model 706.

On the other hand, if no tests failed ("No" branch emanating from 718), then the full set of tests may be run (at 722). The test results may be checked for any test failure(s) (at 724). If there were test failures ("Yes" branch emanating from 724), then the failing test case may be identified (at 720). The failing test cases and the corresponding test categories may then be used to incrementally train prediction model 706, e.g., the failing test cases and the corresponding test categories may be used in one or more training iterations to improve the accuracy of prediction model 706. On the other hand, if no tests failed ("No" branch emanating from 724), then the testing of the design may complete, and the process may end (at 726).

Figure 8:
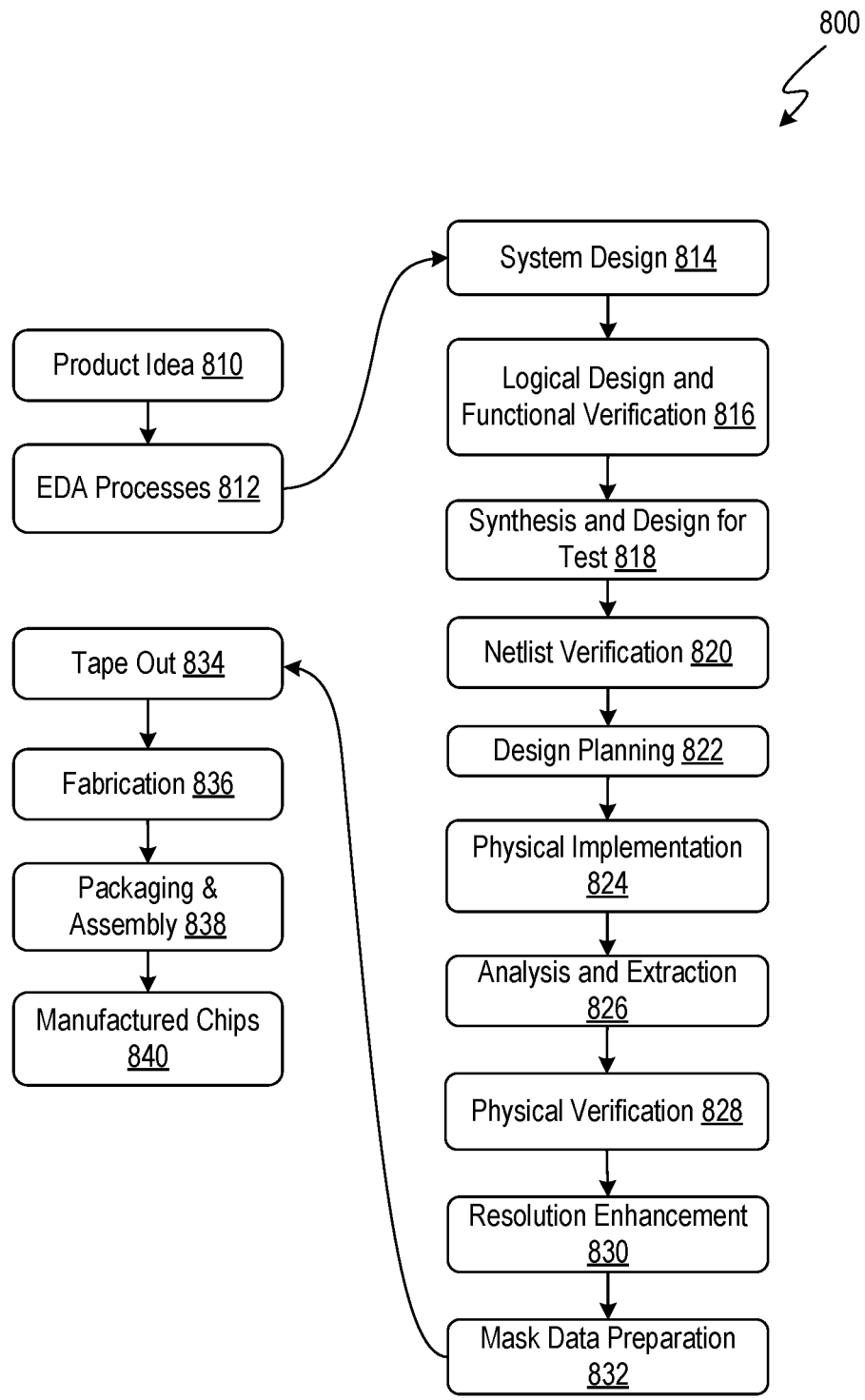
FIG. 8 illustrates an example flow for the design, verification, and fabrication of an integrated circuit in accordance with some embodiments described herein.

FIG. 8 illustrates an example flow 800 for the design, verification, and fabrication of an integrated circuit in accordance with some embodiments described herein.

EDA processes 812 (the acronym "EDA" refers to "Electronic Design Automation") can be used to transform and verify design data and instructions that represent the integrated circuit. Each of these processes can be structured and enabled as multiple modules or operations.

Flow 800 can start with the creation of a product idea 810 with information supplied by a designer, information which is transformed and verified by using EDA processes 812. When the design is finalized, the design is taped-out 834, which is when artwork (e.g., geometric patterns) for the integrated circuit is sent to a fabrication facility to manufacture the mask set, which is then used to manufacture the integrated circuit. After tape-out, a semiconductor die is fabricated 836 and packaging and assembly 838 are performed to produce the manufactured IC chip 840.

Specifications for a circuit or electronic structure may range from low-level transistor material layouts to high-level description languages. A high-level of abstraction may be used to design circuits and systems, using a hardware description language ("HDL") such as VHDL, Verilog, SystemVerilog, SystemC, MyHDL or OpenVera. The HDL description can be transformed to a logic-level register transfer level ("RTL") description, a gate-level description, a layout-level description, or a mask-level description. Each lower abstraction level that is a less abstract description adds more detail into the design description. The lower levels of abstraction that are less abstract descriptions can be generated by a computer, derived from a design library, or created by another design automation process. An example of a specification language at a lower level of abstraction language for specifying more detailed descriptions is SPICE (which stands for "Simulation Program with Integrated Circuit Emphasis"). Descriptions at each level of abstraction contain details that are sufficient for use by the corresponding tools of that layer (e.g., a formal verification tool).

During system design 814, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 816, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 818, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 820, the netlist is checked for compliance with timing constraints and for correspondence with the HDL code. During design planning 822, an overall floor plan for the integrated circuit is constructed and analyzed for timing and top-level routing.

During layout or physical implementation 824, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 826, the circuit function is verified at the layout level, which permits refinement of the layout design. During physical verification 828, the layout design is checked to ensure that manufacturing constraints are correct, such as DRC constraints, electrical constraints, lithographic constraints, and that circuitry function matches the HDL design specification. During resolution enhancement 830, the geometry of the layout is transformed to improve how the circuit design is manufactured.

During tape-out, data is created to be used (after lithographic enhancements are applied if appropriate) for production of lithography masks. During mask data preparation 832, the 'tape-out' data is used to produce lithography masks that are used to produce finished integrated circuits.

A storage subsystem of a computer system (such as computer system 900 of FIG. 9) may be used to store the programs and data structures that are used by some or all of the EDA products described herein, and products used for development of cells for the library and for physical and logical design that use the library.

Figure 9:
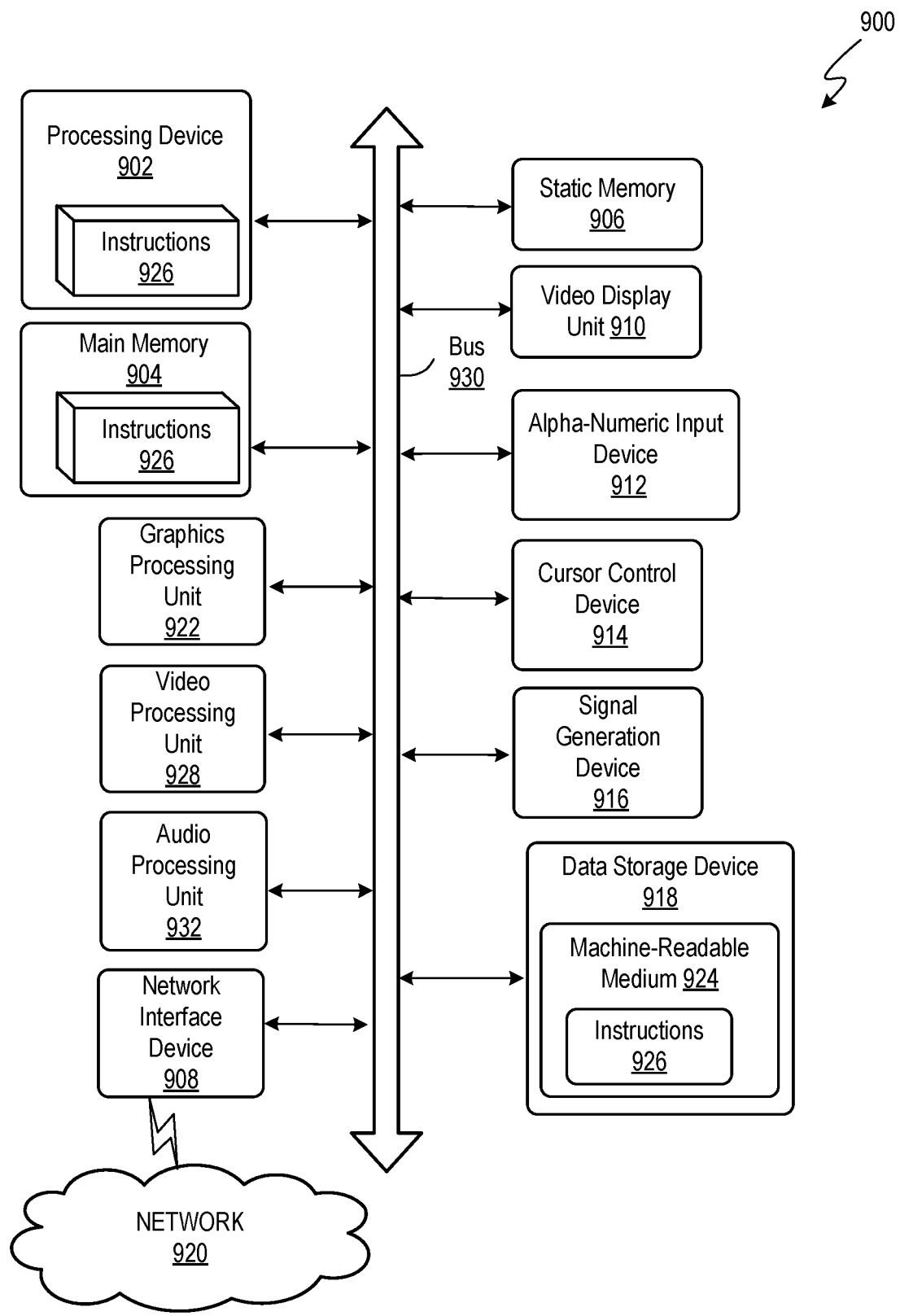
FIG. 9 illustrates an example machine of a computer system 900 within which a set of instructions, for causing the machine to perform any one or more of the methodologies discussed herein, may be executed.

FIG. 9 illustrates an example machine of a computer system 900 within which a set of instructions, for causing the machine to perform any one or more of the methodologies discussed herein, may be executed.

In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
receiving training data comprising change-lists and descriptions associated with the change-lists, wherein a change-list specifies a set of changes to a design or a test case, or both, and wherein the descriptions are specified in a natural language; and
training, by a processor, a machine learning (ML) model based on the training data, wherein the ML model comprises a first neural network (NN), a second NN, and a third NN, wherein the first NN includes a first input layer and a first output layer, wherein the first input layer includes a first set of input nodes corresponding to an author name, a file name, and a set of vocabulary words or phrases, wherein the first output layer includes a first set of output nodes corresponding to a set of test categories, wherein the second NN includes a second input layer and a second output layer, wherein the second input layer includes a second set of input nodes corresponding to the author name, the file name, and a set of word or character positions in the descriptions, wherein the second output layer includes a second set of output nodes corresponding to the set of test categories, and wherein the third NN includes a third input layer and a third output layer, wherein the third input layer includes a third set of input nodes corresponding to the first set of output nodes and the second set of output nodes, and wherein the third output layer includes a third set of output nodes corresponding to the set of test categories;
receiving a first change-list and a first description associated with the first change-list for a first design, wherein the first design is an integrated circuit design;
using the trained ML model to select a first subset of test cases from a set of test cases for testing the first design based on the first change-list and the first description; and
running the first subset of test cases on a testbench which simulates the first design.

2. The method of claim 1, further comprising:
in response to the first design failing one or more test cases in the first set of test cases,
receiving a second change-list and a second description for a second design, wherein the second design is created by modifying the first design to overcome the failure of the one or more test cases in the first set of test cases, and
using the trained ML model to predict a second set of test cases for testing the second design based on the second change-list and the second description.

3. The method of claim 1, further comprising:
in response to the first design passing the first set of test cases,
testing the first design using a second set of test cases, wherein the second set of test cases is different from the first set of test cases, and
in response to the first design failing one or more test cases in the second set of test cases, using the one or more failed test cases in the second set of test cases to train the ML model.

4. A non-transitory computer-readable medium comprising stored instructions, which when executed by a processor, cause the processor to:
receive a first change-list and a first description for a first design, wherein the first design is an integrated circuit design, wherein the first change-list specifies changes to the first design, or a first test case used for testing the first design, or both, and wherein the first description is specified in a natural language;
use a trained machine learning (ML) model to select a first subset of test cases from a set of test cases for testing the first design based on the first change-list and the first description, wherein the ML model comprises a first neural network (NN), a second NN, and a third NN, wherein the first NN includes a first input layer and a first output layer, wherein the first input layer includes a first set of input nodes corresponding to an author name, a file name, and a set of vocabulary words or phrases, wherein the first output layer includes a first set of output nodes corresponding to a set of test categories, wherein the second NN includes a second input layer and a second output layer, wherein the second input layer includes a second set of input nodes corresponding to the author name, the file name, and a set of word or character positions in the descriptions, wherein the second output layer includes a second set of output nodes corresponding to the set of test categories, and wherein the third NN includes a third input layer and a third output layer, wherein the third input layer includes a third set of input nodes corresponding to the first set of output nodes and the second set of output nodes, and wherein the third output layer includes a third set of output nodes corresponding to the set of test categories; and
running the first subset of test cases on a testbench which simulates the first design.

5. The non-transitory computer-readable medium of claim 4, wherein the instructions, which when executed by the processor, cause the processor to:
in response to the first design failing one or more test cases in the first set of test cases,
receive a second change-list and a second description for a second design, wherein the second design is created by modifying the first design to overcome the failure of the one or more test cases in the first set of test cases, and
use the trained ML model to predict a second set of test cases for testing the second design based on the second change-list and the second description.

6. The non-transitory computer-readable medium of claim 4, wherein the instructions, which when executed by the processor, cause the processor to:
in response to the first design passing the first set of test cases,
test the first design using a second set of test cases, wherein the second set of test cases is different from the first set of test cases, and
in response to the first design failing one or more test cases in the second set of test cases, use the one or more failed test cases in the second set of test cases to train the ML model.

7. The non-transitory computer-readable medium of claim 4, wherein the instructions, which when executed by the processor, cause the processor to:
receive training data comprising change-lists and descriptions associated with the change-lists, wherein each change-list specifies changes to a design or a test case, or both, and wherein the descriptions are specified in a natural language; and
train ML model based on the training data.

8. An apparatus, comprising:
a memory storing instructions; and
a processor, coupled with the memory and to execute the instructions, the instructions when executed causing the processor to:
receive training data comprising change-lists and descriptions associated with the change-lists, wherein a change-list specifies a set of changes to a design or a test case, or both, and wherein the descriptions are specified in a natural language;
train a machine learning (ML) model based on the training data, wherein the ML model comprises a first neural network (NN), a second NN, and a third NN, wherein the first NN includes a first input layer and a first output layer, wherein the first input layer includes a first set of input nodes corresponding to an author name, a file name, and a set of vocabulary words or phrases, wherein the first output layer includes a first set of output nodes corresponding to a set of test categories, wherein the second NN includes a second input layer and a second output layer, wherein the second input layer includes a second set of input nodes corresponding to the author name, the file name, and a set of word or character positions in the descriptions, wherein the second output layer includes a second set of output nodes corresponding to the set of test categories, and wherein the third NN includes a third input layer and a third output layer, wherein the third input layer includes a third set of input nodes corresponding to the first set of output nodes and the second set of output nodes, and wherein the third output layer includes a third set of output nodes corresponding to the set of test categories;
receive a first change-list and a first description for a first design, wherein the first design is an integrated circuit design;
use the trained ML model to select a first subset of test cases from a set of test cases for testing the first design based on the first change-list and the first description; and
run the first subset of test cases on a testbench which simulates the first design.

9. The apparatus of claim 8, wherein the instructions, which when executed by the processor, cause the processor to:
    in response to the first design failing one or more test cases in the first set of test cases,
        receive a second change-list and a second description for a second design, wherein the second design is created by modifying the first design to overcome the failure of the one or more test cases in the first set of test cases, and
        use the trained ML model to predict a second set of test cases for testing the second design based on the second change-list and the second description.

10. The apparatus of claim 8, wherein the instructions, which when executed by the processor, cause the processor to:
    in response to the first design passing the first set of test cases,
        test the first design using a second set of test cases, wherein the second set of test cases is different from the first set of test cases, and
        in response to the first design failing one or more test cases in the second set of test cases, use the one or more failed test cases in the second set of test cases to train the ML model.

\* \* \* \* \*